C. SCHMIDT.
WATERING TROUGH.
APPLICATION FILED SEPT. 13, 1920.
1,383,342.
Patented July 5, 1921.
4 SHEETS—SHEET 1.
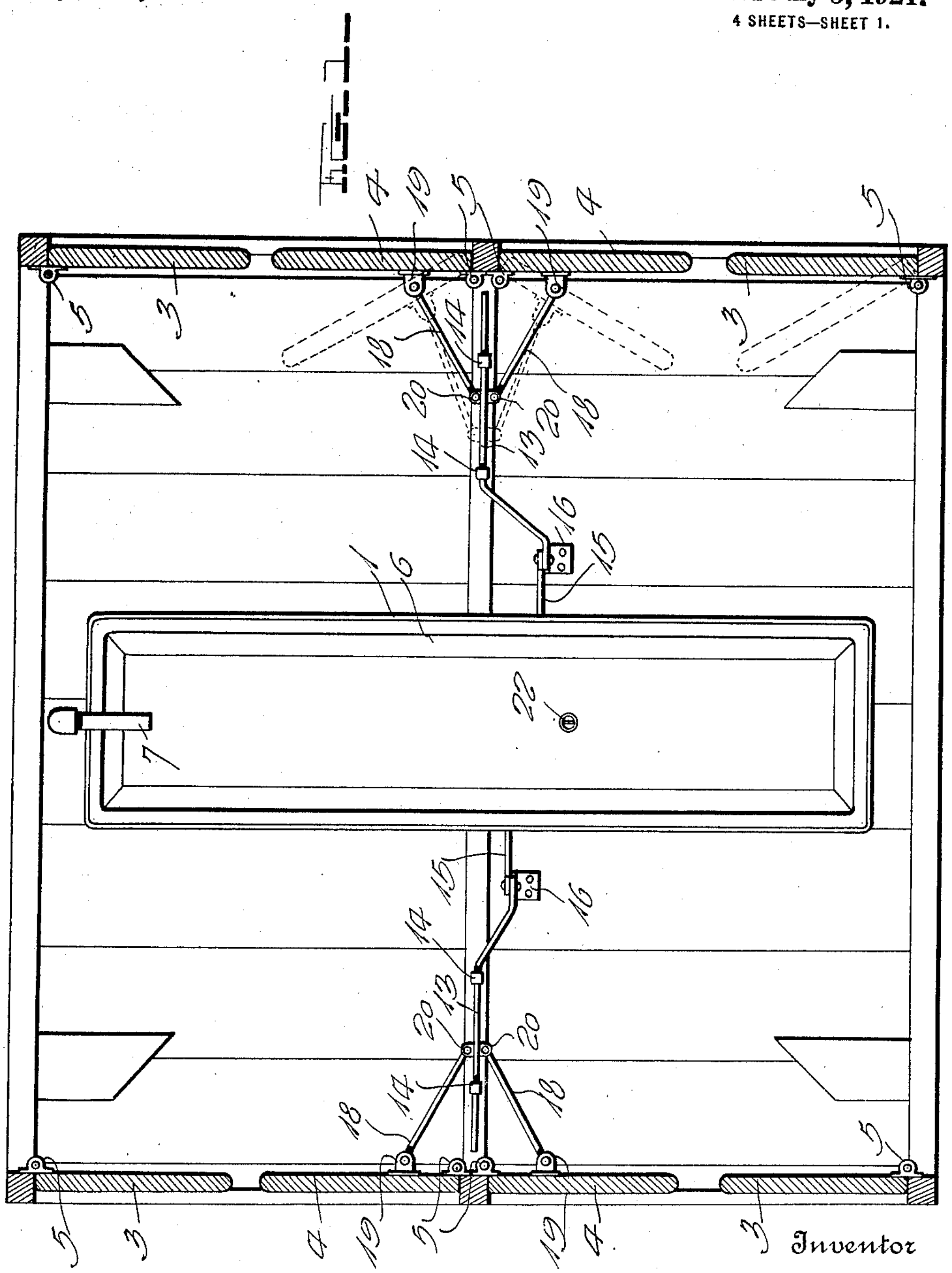
Inventor
C. Schmidt
Witness
H. Woodard
By A. B. Willson & Co.
Attorneys C. SCHMIDT.
WATERING TROUGH.
APPLICATION FILED SEPT. 13, 1920.
1,383,342. Patented July 5, 1921.
4 SHEETS—SHEET 2.
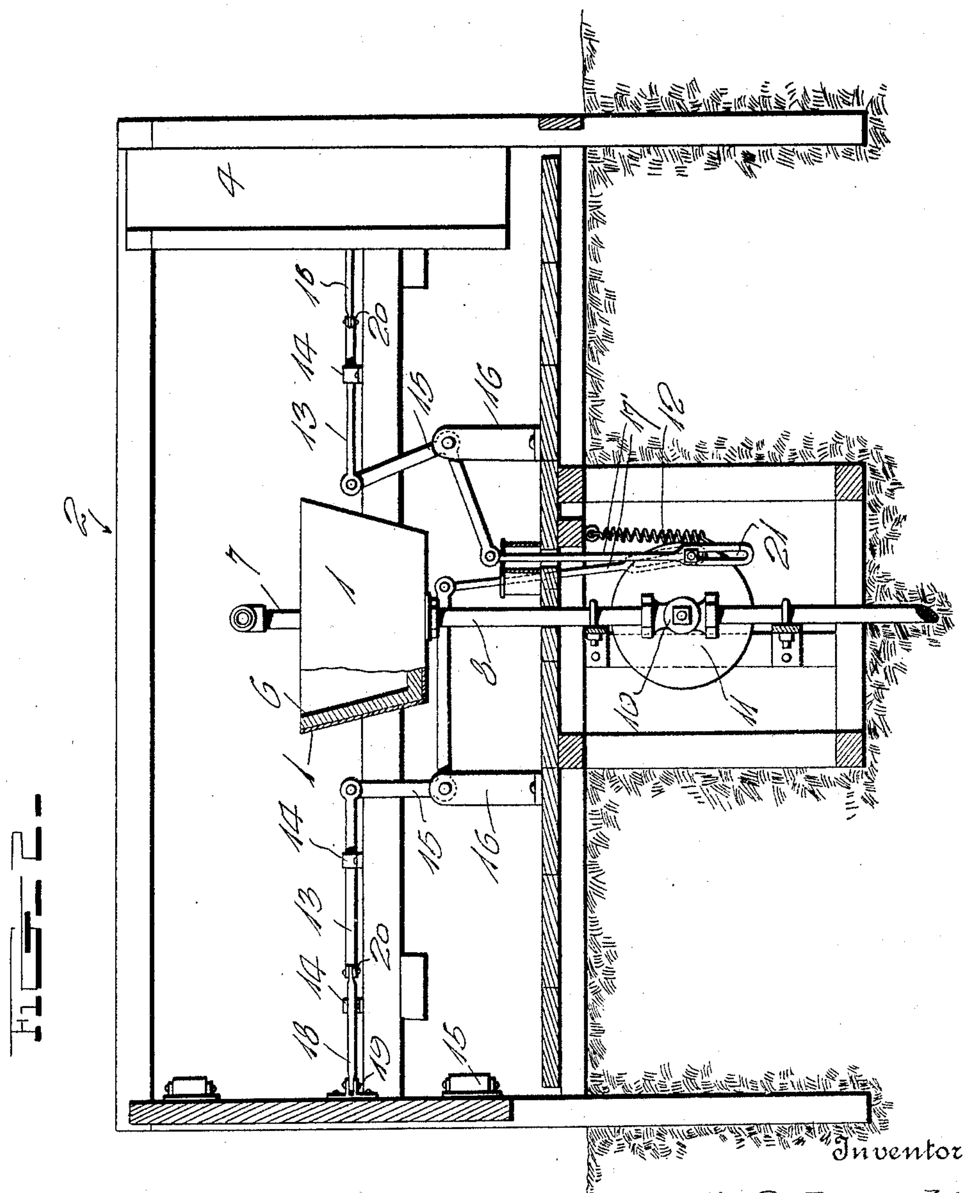
Witness
H. Woodard
Inventor
C. Schmidt
By A. B. Wilson & Co
Attorneys C. SCHMIDT.
WATERING TROUGH.
APPLICATION FILED SEPT. 13, 1920.
1,383,342. Patented July 5, 1921.
4 SHEETS—SHEET 3.
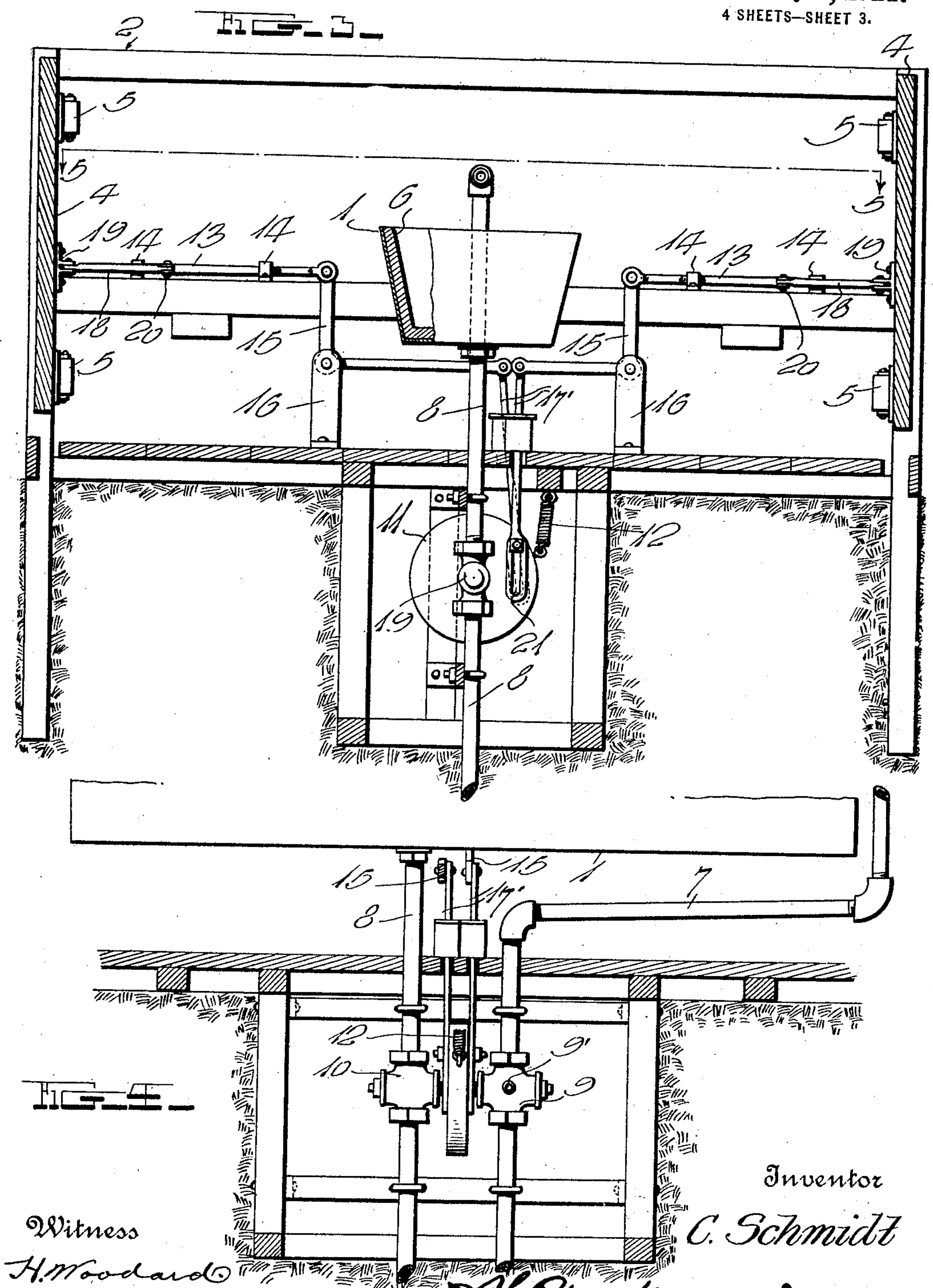
Witness
H. Woodard
Inventor
C. Schmidt
By [signature] & Co.
Attorneys C. SCHMIDT.
WATERING TROUGH.
APPLICATION FILED SEPT. 13, 1920.
1,383,342.
Patented July 5, 1921.
4 SHEETS—SHEET 4.
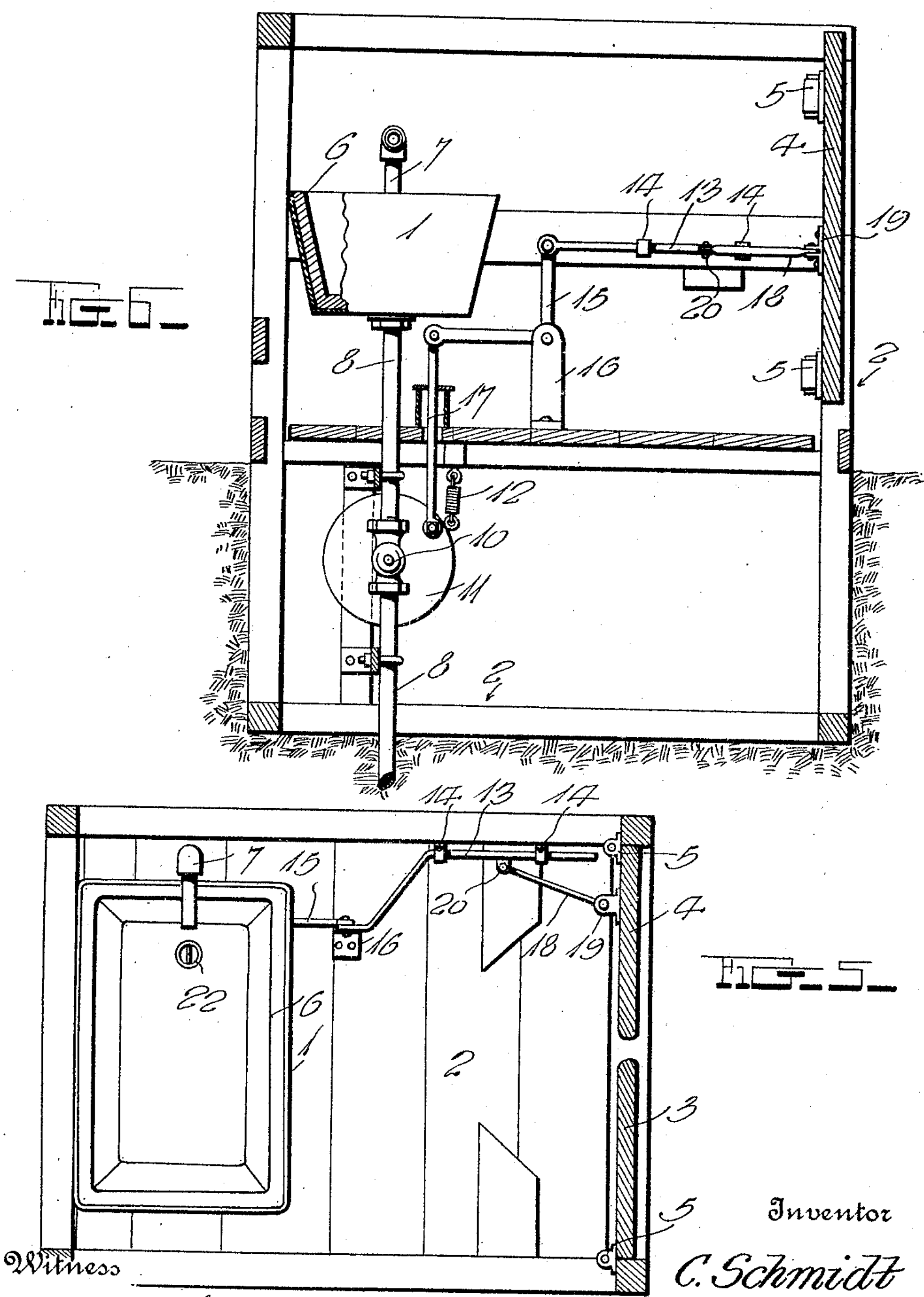

UNITED STATES PATENT OFFICE.

CHRIST SCHMIDT, OF EVERETT, WASHINGTON.

WATERING-TROUGH.

1,383,342. Specification of Letters Patent. Patented July 5, 1921.

Application filed September 13, 1920. Serial No. 409,840.

*To all whom it may concern:*

Be it known that I, CHRIST SCHMIDT, a citizen of the United States, residing at Everett, in the county of Snohomish and State of Washington, have invented certain new and useful Improvements in Watering-Troughs; and I do declare the following to be a full, clear, and exact description of the invention, such as will enable others skilled in the art to which it appertains to make and use the same.

This invention relates to an improved watering trough for use in watering stock such as cattle and horses and one object of the invention is to provide an improved type of inclosure for a trough, the inclosure having doors connected with valve actuating means so that water may be permitted to flow into the trough when the doors are opened and the water which accumulates in the trough while the animal is drinking permitted to flow out of the same when the doors are closed.

Another object of the invention is to so construct the inclosure that an animal must move the doors inwardly to an open position in order to enter the inclosure and reach the drinking trough.

Another object of the invention is to so construct the valve actuating mechanism that the same principle may be applied in connection with an inclosure having a single set of doors or in connection with an inclosure having a plurality of entrances.

Another object of the invention is to so construct the valve actuating mechanism that it may be readily connected with the doors and to further so construct the mechanism that it will be simple in construction and not liable to readily get out of order.

Another object of the invention is to so construct the inclosure that the doors may be readily moved inwardly to an open position by the stock and to further so construct the inclosure that there will be no danger of the doors being prevented from moving by snow or danger of an animal having its head caught in the swinging doors when leaving the inclosure.

This invention is illustrated in the accompanying drawings, wherein:

Figure 1 is a view showing the improved trough and inclosure partially in top plan and partially in horizontal section and showing the valve actuating mechanism connected with the doors, Fig. 2 is a view showing the structure of Fig. 1 partially in elevation and partially in vertical section, Fig. 3 is a view similar to Fig. 2 showing the open door of Fig. 2 in a closed position, Fig. 4 is a fragmentary view in elevation and section showing the connection of the valve operating mechanism with the valve, Fig. 5 is a top plan view showing the invention applied to a structure having an inclosure provided with a single entrance, and a trough for use by one animal, Fig. 6 is a view showing the structure of Fig. 5 partially in elevation and partially in vertical section.

This apparatus is an improvement over the structure shown in my prior Patent No. 1,328,207 issued Jan. 13, 1920, and is provided with the trough 1 positioned within an inclosure indicated in general by the numeral 2 which inclosure will be provided with gates 3 and 4 hingedly mounted as shown at 5 so that the gates may be swung inwardly to an open position. It should be noted that these gates do not meet but are spaced apart a sufficient distance to permit the head of an animal to pass between the gates when closed. Therefore, there will be no danger of an animal catching its head between the gates when backing out of the inclosure.

In the form shown in Fig. 1, the inclosure is relatively large and provided with a plurality of entrances so that more than one animal may enter the inclosure at a time to drink out of the elongated trough, whereas in Figs. 5 and 6, there is shown a relatively small trough and inclosure intended to accommodate only one animal at a time. The same principle is made use of. In each form, the trough will be lined with soap-stone as shown at 6 to prevent danger of the water freezing and adhering to the sides of the trough and this trough will be filled by means of a water pipe 7 which extends above the trough as shown. An outlet or drain pipe 8 is provided to receive the waste water which passes from the trough and each of these pipes will be provided with a valve, the valve of the pipe 7 being indicated by the numeral 9 and that of the pipe 8 by the numeral 10. The valve of the feed pipe 7 will be closed when the valve of the drain pipe 8 is opened and these valves will be connected with a common actuating wheel or disk 11 so that they will be moved together and thus turning of the disk cause one valve to be opened and the other simultaneously closed. It will thus be seen that when the valve 9 is open, the water will flow through the pipe 7 and fill the trough 1 and that as soon as the valve 9 is closed, the water in the pipe 7 above this valve drains out through the drain port 9′ and the valve 10 will open thus permitting the water which has accumulated in the trough to pass out through the drain pipe 8 and into the sewer. A spring 12 is provided and connected with the disk or wheel 11 so that the disk will be normally held in the position shown in Figs. 3 and 6, with the valve 9 of the feed pipe 7 closed and the valve 10 of the drain pipe opened. Therefore, the flow of water through the feed pipe will be normally cut off and the wasting of water prevented and further the accumulation of water in the trough prevented.

In order to impart movement to the disk against the action of the spring, there has been provided for each set of doors, a reciprocating rod 13 which is slidably mounted by bearings 14. In the form shown in Figs. 5 and 6, the rod 13 has its inner end portion connected with a bell crank lever 15 which lever is pivotally mounted by means of the bracket 16 and has one arm connected with a link or pitman 17. This pitman 17 is connected with the disk 11 and it will be readily seen that when the rod 13 is moved inwardly, the disk will be rotated against the action of the spring 12 and the water permitted to flow through the pipe 7 into the trough, the valve of the drain pipe being closed to retain the water in the trough. This rod 13 is connected with the doors 4 by means of a push rod or link 18, one end of which is connected with the bearing bracket 19 secured to the door and the second or inner end portion of which is connected with the side ear 20 of the rod 13. In the form shown in Figs. 1, 2 and 3, the same principle is made use of. The rod 13 is slidably mounted by bearing brackets 14 and is connected with the bell crank lever 15 which bell crank lever is pivotally mounted by means of the bearing bracket 16 and connected with the link 17′. This link 17′ is provided with an elongated slot 21 through which extends the pin for pivotally connecting the link with the disk. By means of this arrangement, it will be readily seen that the link connected with the bell crank lever upon one side of the trough may be moved to actuate the disk without the valve actuating mechanism for the doors upon the opposite side of the trough being moved. The rod 13 is in this form provided with two links 18 instead of one, and these links extend for connection with the doors 4 as shown clearly in Fig. 1. It will thus be seen that when an animal pushes through an entrance in the inclosure and opens the doors, in doing so the door 4 adjoining the entrance through which the animal passes will be swung to an open position, but the doors upon the opposite side of the inclosure will not be opened.

When this device is in use, it is set up as shown with the water trough positioned within the inclosure. When an animal desires a drink, the animal will pass into the inclosure through an entrance and in doing so, the swinging doors will be swung inwardly, the head of the animal will pass through the space between the doors and the shoulders will strike the doors and move them inwardly. As the doors move inwardly, the rod 13 which is connected with one of the doors will be moved longitudinally and the disk with which the rod is connected will be rotated through the medium of the bell crank lever and the pitman. The valve of the feed pipe will be opened and the valve of the drain pipe closed and therefore the water will flow through the feed pipe and fill the trough. As soon as the animal has finished drinking, it will back away from the trough and out through the entrance of the inclosure. The doors will swing to a closed position since the hinges will be of the well known spring type and the springs 12 will rotate the disk and return it to its original position thus closing the valve of the feed pipe and opening the valve of the drain pipe. The water will thus drain out of the trough. A guard 22 is placed at the entrance to the drain pipe within the trough and therefore there will be no danger of the pipe becoming clogged up by refuse which may fall into the trough. As previously stated, the provision of the soapstone lining 6 for the trough, prevents ice from adhering to the trough.

There has thus been provided a valve actuating mechanism used in connection with a trough inclosure and so constructed that the valve actuating mechanism may be connected with a door, which must be swung inwardly by the animal desiring a drink.

I claim:

1. A structure of the character described comprising an inclosure having an entrance, inwardly opening doors hingedly mounted at the entrance and terminating in spaced relation when closed to permit of free passage of the head of an animal between the closed doors, a water receptacle within the inclosure having a feed pipe and a drain pipe, valves for the pipes, and actuating means for the valves operatively connected with one of the doors whereby movement of the door will impart movement to the valves to open and close the same.

2. A structure of the character described comprising an inclosure, a water receptacle in the inclosure, a feed water pipe and a drain water pipe in operative relation to the receptacle, valve for the pipes, a disk having connection with the stems of said valves for opening and closing the valves upon rotation of the disk, inwardly opening doors for said inclosure, rods slidably mounted for movement between the doors and the water receptacle, links connecting the doors with the rods, bell crank levers connected with the rods and pivotally mounted, pitman rods loosely connected with the bell crank levers and having their end portions provided with elongated slots, and fastening means carried by the disk and extending through the slots of the pitman rods to slidably connect the pitman rods with the disk.

3. A structure of the character described comprising an inclosure, a water receptacle in the inclosure having a valve controlled feed pipe and a valve controlled outlet, a rotatably mounted disk having connection with the valves to open one valve while closing the second, upon rotation of the disk, pivoted doors for said inclosure, and means for imparting rotary movement to said disk actuated through inward movement of the doors, said means each including a pitman rod slidably and pivotally connected with said disk.

In testimony whereof I have hereunto set my hand.

CHRIST SCHMIDT.